United States Patent Office 2,952,647
Patented Sept. 13, 1960

2,952,647

SYNTHETIC RESINOUS COMPOSITION CONTAINING A MODIFIED POLYAMIDE AND THE CONDENSATION PRODUCT OF A POLYHYDRIC PHENOL AND AN HALOHYDRIN

Geoffrey Swann, Hunts Cross, Woolton, and Peter Gilbert Evans, Liverpool, England, assignors to Beck, Koller & Company (England) Limited, Liverpool, England, a British company No Drawing. Filed Jan. 10, 1957, Ser. No. 633,391

Claims priority, application Great Britain Jan. 19, 1956

6 Claims. (Cl. 260—21)

This invention relates to new synthetic resin compositions.

The compositions of the invention comprise an epoxy resin containing terminal epoxy groups and a modified polyamide which is the condensation product of one or more polyamines with a co-polymerization product of styrene or a hydrocarbon-substituted styrene, such as α-methyl styrene or vinyl toluene, and dehyrated castor oil fatty acids. The said modified polyamides and their production are described in our co-pending application Serial No. 633,390, filed January 10, 1957.

Such modified polyamides are preferably obtained by condensing by heating, under reflux, a mixture of (A) a monomeric organic polyamine with (B) a copolymerization product produced by heating, under reflux, a charge comprising essentially (1) a monomeric substance selected from a group consisting of styrene alpha methylstyrene and vinyl toluene and (2) dehydrated castor oil fatty acids, the charge being heated to the boiling point of the monomeric substance, the molar range of substance (1) to dehydrated castor oil fatty acid being between 2:1 and 1:2, the ratio of (A) polyamine to (B) copolymer being not greater than 1 mol of polyamine per mol of carboxy group, and the lower limit of polyamine to acid being that quantity containing one equivalent of primary amino group per one carboxyl group in the acid component.

As is known, the above epoxy resins are complex polymeric reaction products of polyhydric phenols with polyfunctional halohydrins, such as epichlorohydrin and glycol dichlorohydrin. The products obtained may contain terminal epoxy groups or terminal epoxy groups and terminal primary hydroxyl groups. Typical polyhydric phenols include resorcinol and various bis-phenols resulting from the condensation of phenol with aldehydes and ketones such as formaldehyde, acetaldehyde, acetone and methyl ethyl ketone. Suitable epoxy resins are the commercially available resins known in England as Epikote resins. "Epikote" is the English trade name for the products of Shell Chemicals Ltd., and are condensation products of epichlorohydrin and diphenylolpropane. Such Epikote resins are designated by number according to their respective viscosities, as, for example, Epikote 828 and Epikote 1001, the former being a viscous liquid and the latter a solid at ordinary room temperatures.

Synthetic resin compositions comprising the modified polyamide resins and the epoxy resins are heat-curable and may be used with advantage in solution in solvents as film formers. The synthetic resin compositions can with particular advantage be made up by blending the modified polyamide resins with the epoxy resins by heating in the absence of solvents for use in potting, moulding, casting, laminating or impregnating. These heat-blended compositions have the advantage that they remain liquid at the blending temperature for a much longer time than do corresponding compositions containing unmodified polyamide resins.

The following examples further illustrate the invention:

*Example 1*

The modified polyamide employed was very similar to that described in Example 1 of our copending application Ser. No. 633,390. The resin in question had the following characteristics:

Viscosity _____ (Gardner-Holdt scale) R–SS (60% in 1:1 butanol:toluene).
Colour _____ 9 (Gardner-Holdt scale) R–SS (60% in 1:1 butanol:toluene).
Acid value (base resin) _. 5.2.

This was made up to a 50% solution in a mixture of equal parts of xylene and isopropanol and the solution was blended with a 50% solution of Epikote 1001 (ex Shell Chemicals Ltd.) in 1:1 xylene:methyl isobutyl ketone to give solutions with base Epikote resin:base polyamide resin ratios of 3:1 (B) and 1:1 (A). These solutions were then sprayed on to glass panels for testing. The drying times as measured on the Beck, Koller Drying Recorder were Hours
A _____ ½ to 4½
B _____ ½ to 8½

Some of the panels were air-dried and others were stoved in a convection oven for 30 minutes at 120° C. Sward rocker hardness figures are shown below:

|  | 24 hours | 96 hours | 168 hours |
|---|---|---|---|
| A (air dried) | 8 | 13 | 20 |
| A (stoved) | 17 | 25 | 29 |
| B (air dried) | 17 | 30 | 46 |
| B (stoved) | 29 | 54 | 57 |

The resistances were tested with the following results:

|  | Water | 2% "Tide" solution | 10% Caustic soda solution | 10% Sulphuric acid solution |
|---|---|---|---|---|
| A (air dried) | Fair | Poor | Good | Fair-good. |
| A (stoved) | do | do | do | Fair. |
| B (air dried) | Fair-good | Good | do | Good. |
| B (stoved) | Good | Fair-good | do | Do. |

Tin-plate panels also were prepared for the following tests.

|  | Gloss | Flow | Mar-resistance | Bend ⅛ and ¼ | Scratch test |
|---|---|---|---|---|---|
| A (air dried) | Very good. | Good | Very poor. | Passed | 900 |
| A (stoved) | do | Very good. | Poor | do | 900 |
| B (air dried) | do | do | Very poor. | Failed | 800 |
| B (stoved) | do | do | do | do | 1400 |

The two solutions used were checked for pot life at room temperature with the following results:

A _____ 14 days.
B _____ Greater than 20 days.

*Example 2*

Solventless blends suitable for casting applications were made by melting the above polyamide resin with Epikote 828 (ex Shell Chemicals Ltd.). The following summarizes these results:

| W./W. ratios Polyamide : Epikote | Clear hot 70° C. | Clear cold 70° C. | Gelled | Product |
|---|---|---|---|---|
| | mins. | mins. | mins. | |
| 8:2 | 0 | 2 | 55 | Soft and sticky. |
| 7:3 | 0 | 15 | 45 | Rubbery. |
| 6:4 | 2 | 10 | 45 | Fairly hard. |
| 5:5 | 5 | 15 | 65 | Hard and tough. |
| 4:6 | 5 | 20 | >120 | Hard and tough. |
| 3:7 | 3 | 24 | >120 | Rubbery. |

Example 3

One part by weight of the polyamide of Example 9 of application Serial No. 633,390 was blended with one part by weight of Epikote 828 (ex Shell Chemicals Ltd.) by heating at 70° C. The product became clear hot after 1¼ minutes, clear cold after 4½ minutes and gelled after 13 minutes to form a hard and tough product.

Example 4

Example 3 was repeated but replacing the polyamide of Example 9 of application Serial No. 633,390 by an equal weight of the polyamide of Example 6 of application Serial No. 633,390. The product became clear hot after ½ minute, clear cold after 5½ minutes and gelled after 22 minutes to form a hard and tough product.

Example 5

Example 3 was repeated but replacing the polyamide of Example 9 of application Serial No. 633,390 by an equal weight of the polyamide of Example 7 of application Serial No. 633,390. The product became clear hot after 4 minutes, clear cold after 7½ minutes and gelled after 21 minutes to form a hard tough clear resin.

Example 6

Seven parts by weight of the polyamide of Example 4 of application Serial No. 633,390 was blended with 3 parts by weight of Epikote 1001 (ex Shell Chemicals Ltd.) by heating for some minutes on a hot plate. A gelled product was obtained.

Example 7

Example 6 was repeated but using 9 parts of the polyamide and 1 part of the Epikote 1001. A similar result was obtained.

Example 8

Example 7 was repeated but replacing the polyamide by an equal weight of the polyamide of Example 5 of application Serial No. 633,390. A similar result was obtained.

Epikote 1001 and Epikote 828, referred to above, are English trade names for products of Shell Chemicals, Limited, and are the same as Epon 1001 and Epon 828, respectively, which are the trade marks of Shell Chemical Corporation, 460 Park Avenue, New York 22, N.Y. These products are defined in Reinhold's "The Condensed Chemical Dictionary," 5th Edition, 1956, as condensation polymers of epichlorohydrin and bisphenol-A.

Bakelite 18774 is likewise a British trade mark for a commercially available product which is understood to be the same as that sold in the United States under the trade name ERL 2795, which is understood to be proprietary product of Union Carbide and Carbon Corporation, 30 East 42nd Street, New York 17, N.Y.

The following table shows the relationship of the corresponding British and U.S. resins as well as their epoxide equivalents and average molecular weights:

| British resin | U.S. Equivalent | Epoxide Equivalent | Average Molecular wt. |
|---|---|---|---|
| Epikote 1001 | Epon 1001 | 450—525 | 900—1000 |
| Epikote 828 | Epon 828 | 175—210 | 350— 400 |
| Bakelite R. 18774 | ERL 2795 | 179—194 | 340— 400 |

The epoxide equivalent is defined as the weight of resin in grams which contains 1 gram chemical equivalent of epoxy.

What we claim is:

1. A synthetic resinous composition comprising a blend of (I) a substantial quantity of an epoxy resin containing terminal epoxy groups and comprising the resinous condensation product of a polyhydric phenol and a polyfunctional halohydrin selected from a group consisting of epichlorohydrin and glycoldichlorohydrin with (II) a substantial quantity of a modified polyamide which is a condensation product obtained by condensing by heating, under reflux, a mixture of (A) a monomeric organic polyamine with (B) a copolymerization product produced by heating, under reflux, a charge comprising essentially (1) a monomeric substance selected from a group consisting of styrene alpha methylstyrene and vinyl toluene and (2) dehydrated castor oil fatty acids, the charge being heated to the boiling point of the monomeric substance, the molar range of substance (1) to dehydrated castor oil fatty acid being between 2:1 and 1:2, the ratio of (A) polyamine to (B) copolymer being not greater than 1 mol of polyamine per mol of carboxy group, and the lower limit of polyamine to acid being that quantity containing one equivalent of primary amino group per one carboxyl group in the acid component.

2. A synthetic resinous composition as defined in claim 1, wherein substance (1) is styrene.

3. A synthetic resinous composition as defined in claim 1, wherein substance (1) is vinyl toluene.

4. A synthetic resinous composition as defined in claim 1, wherein the polyamine is diethyl triamine.

5. A synthetic resinous composition as defined in claim 1, wherein the polyamine is diethyl amine.

6. A synthetic resinous composition as defined in claim 1, wherein the polyamine is p,p'-diaminodiphenylmethane.

References Cited in the file of this patent

UNITED STATES PATENTS

| 2,468,534 | Young | Apr. 26, 1949 |
| 2,589,245 | Greenlee | Mar. 18, 1952 |
| 2,705,223 | Renfrew | Mar. 29, 1955 |

OTHER REFERENCES

Renfrew et al.: Industrial and Engineering Chem., vol. 45, No. 10 (1954), pages 2226-2232.